United States Patent
Fujiwara et al.

(10) Patent No.: US 10,285,041 B2
(45) Date of Patent: May 7, 2019

(54) WIRELESS COMMUNICATION APPARATUS, IDENTIFICATION INFORMATION SETUP METHOD, AND PROGRAM

(71) Applicant: RENESAS ELECTRONICS CORPORATION, Tokyo (JP)

(72) Inventors: Taku Fujiwara, Tokyo (JP); Yoshihiro Hayashi, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 4 days.

(21) Appl. No.: 15/719,530

(22) Filed: Sep. 28, 2017

(65) Prior Publication Data

US 2018/0152829 A1 May 31, 2018

(30) Foreign Application Priority Data

Nov. 28, 2016 (JP) .................. 2016-229761

(51) Int. Cl.
*H04W 8/00* (2009.01)
*H04W 76/11* (2018.01)
(Continued)

(52) U.S. Cl.
CPC .............. *H04W 8/005* (2013.01); *H04W 4/80* (2018.02); *H04W 76/10* (2018.02); *H04W 76/11* (2018.02); *H04W 84/12* (2013.01); *H04W 84/18* (2013.01)

(58) Field of Classification Search
CPC ..... H04W 48/18; H04W 48/16; H04W 8/183; H04W 76/02; H04W 84/12; H04W 88/06;
(Continued)

(56) References Cited

U.S. PATENT DOCUMENTS

2012/0099566 A1\* 4/2012 Laine ................. H04M 1/7253
370/338
2016/0295072 A1\* 10/2016 Nagasawa ............ H04N 1/4413
2017/0366937 A1\* 12/2017 Lee ....................... H04W 4/023

FOREIGN PATENT DOCUMENTS

JP 2015-033084 A 2/2015

\* cited by examiner

*Primary Examiner* — Fred A Casca
(74) *Attorney, Agent, or Firm* — McDermott will & Emery LLP

(57) ABSTRACT

A wireless communication apparatus includes a communication controller and an identification information setup portion. The communication controller establishes first communication, namely, communication with a first wireless communication apparatus having identification information already set and receives first information, namely, information to settle the identification information to be set, from the first wireless communication apparatus. The identification information setup portion sets the identification information for the wireless communication apparatus based on the first information. After setting the identification information, the communication controller establishes second communication, namely, communication with a second wireless communication apparatus having identification information not set yet, and transmits second information, namely, information to settle the identification information to be set for the second wireless communication apparatus, to the second wireless communication apparatus. The communication controller transmits the second information to one second wireless communication apparatus and subsequently does not transmit the second information.

13 Claims, 8 Drawing Sheets

(51) Int. Cl.
*H04W 76/10* (2018.01)
*H04W 84/18* (2009.01)
*H04W 84/12* (2009.01)
*H04W 4/80* (2018.01)

(58) Field of Classification Search
CPC . H04W 8/005; H04W 16/00; H04W 36/0022; H04W 36/14; H04W 36/18; H04W 36/28; H04W 48/20; H04W 4/80; H04W 84/18; H04W 76/10; H04W 76/11; G06Q 20/327; G06Q 20/3672; G06Q 30/0267; H04M 2250/02
USPC ...... 455/435.2, 552.1, 411, 414.1, 418, 41.2, 455/566
See application file for complete search history.

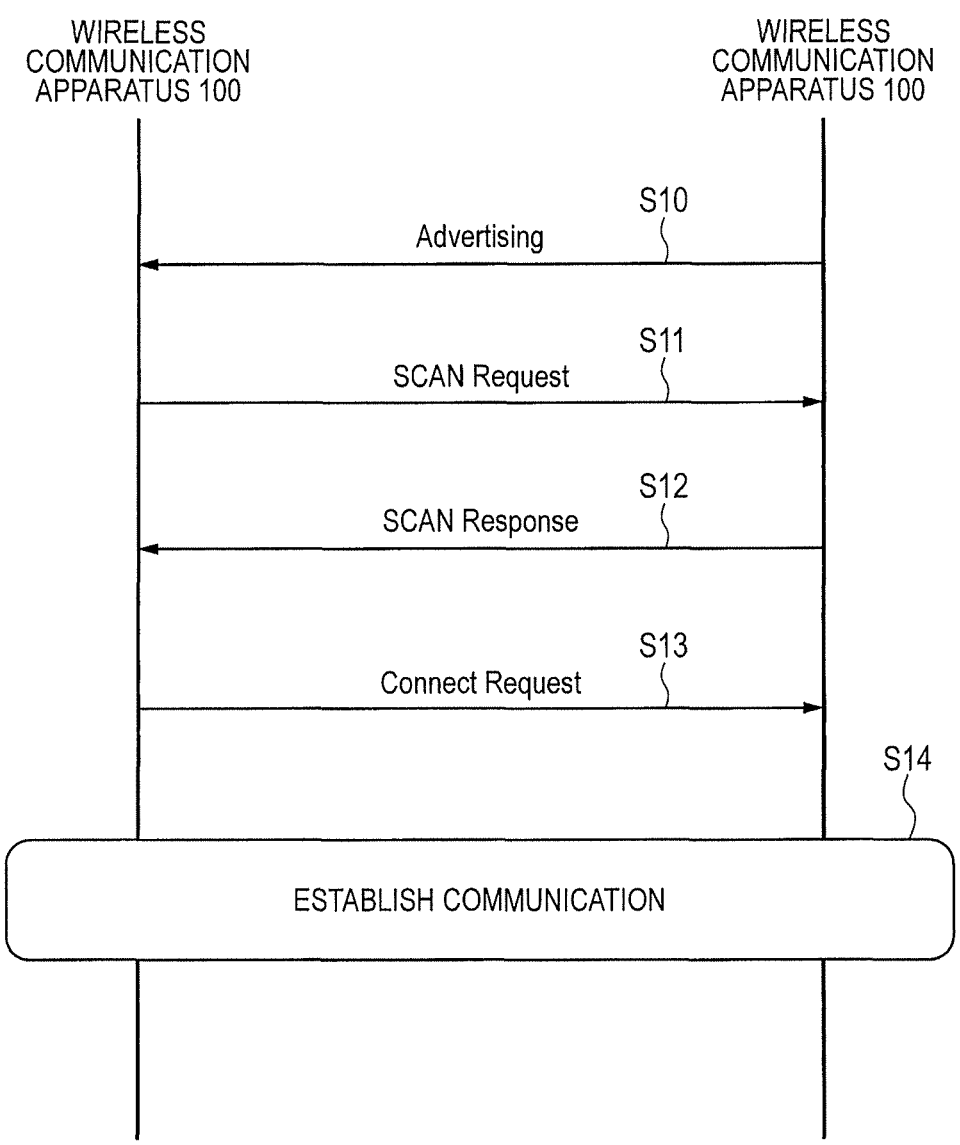

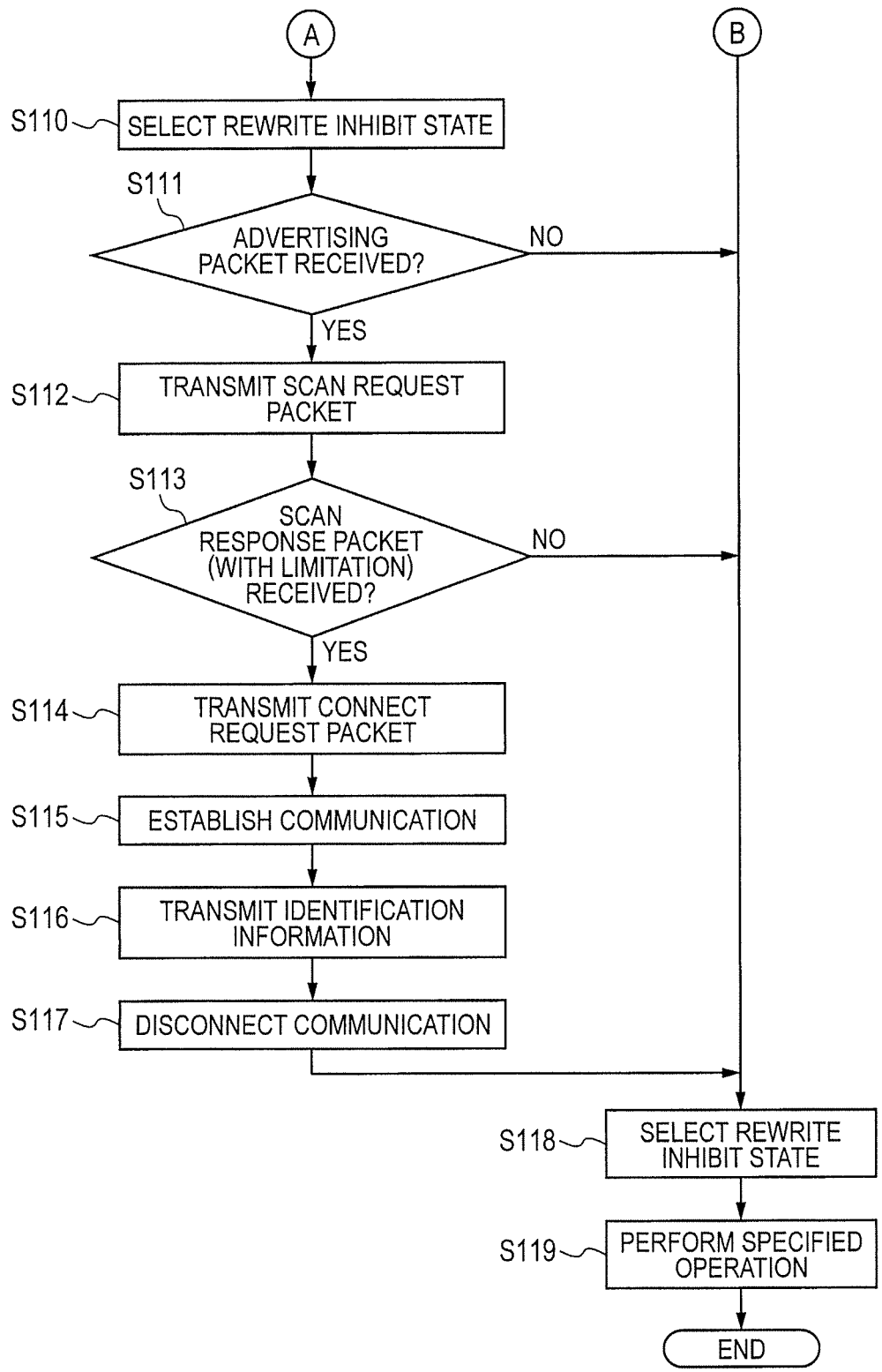

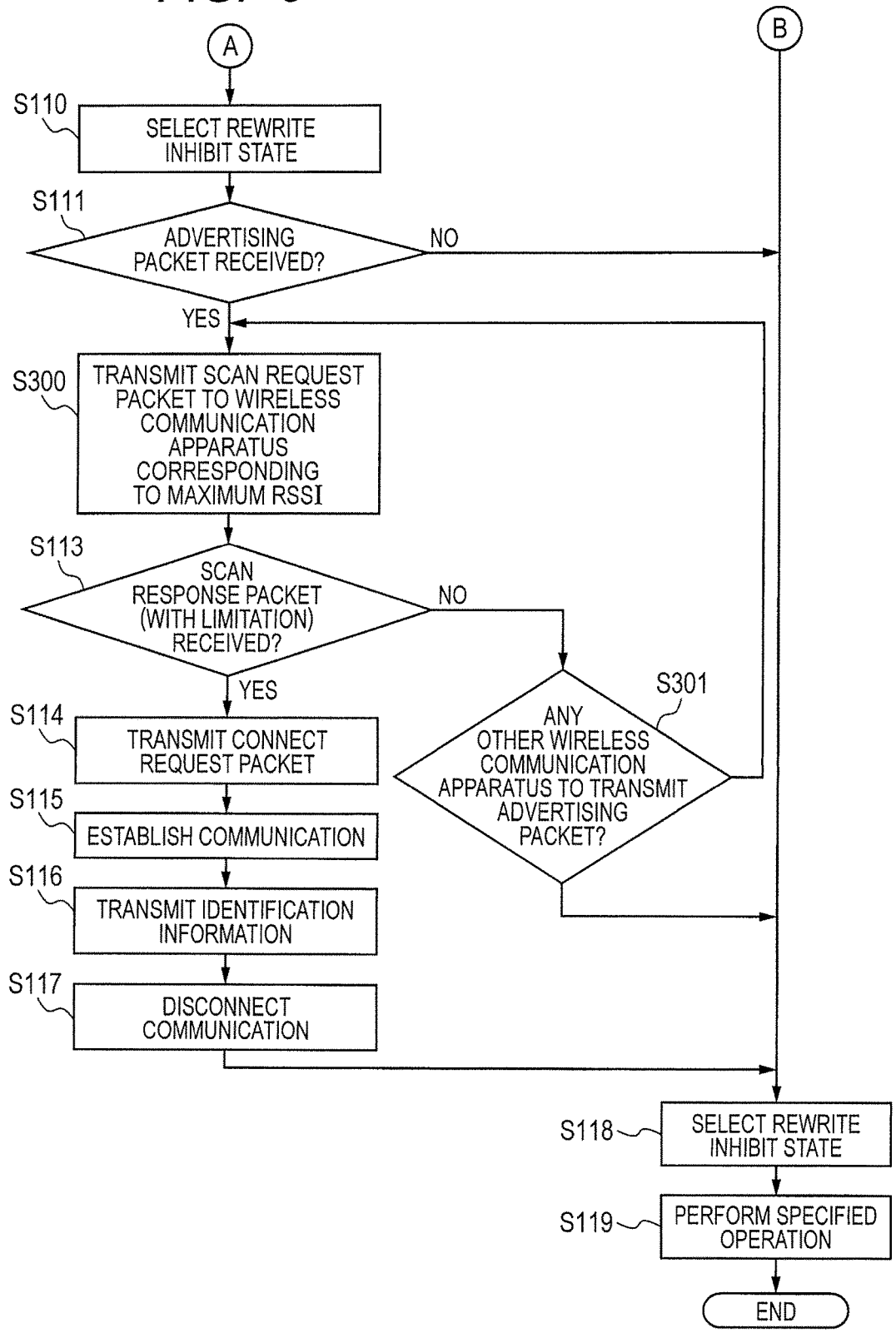

WIRELESS COMMUNICATION APPARATUS, IDENTIFICATION INFORMATION SETUP METHOD, AND PROGRAM

CROSS-REFERENCE TO RELATED APPLICATIONS

The disclosure of Japanese Patent Application No. 2016-229761 filed on Nov. 28, 2016 including the specification, drawings and abstract is incorporated herein by reference in its entirety.

BACKGROUND

The present intention relates to a wireless communication apparatus, an identification information setup method, and a program and more particularly to a wireless communication apparatus, an identification information setup method, and a program capable of providing identification information for a plurality of wireless communication apparatuses.

There is proposed a system using a wireless communication apparatus. For example, patent literature 1 discloses the information provision system that can provide information or services to a plurality of user terminals by using wireless communication compliant with the Bluetooth (registered trademark) Low Energy (BLE) standard. In this system, a store terminal including a BLE wireless communication module transmits a terminal ID to a server.

Patent Literature 1: Japanese Unexamined Patent Application Publication No. 2015-033084

SUMMARY

As above, the identification information (also referred to as ID) set up for the wireless communication apparatus may be used for system processing. In this case, the wireless communication apparatus needs to include the identification information that uniquely identifies the wireless communication apparatus. Increasing the number of wireless communication apparatuses used for the system increases the quantity of work if an administrator sets the identification information one by one for the wireless communication apparatus. There is therefore a need for a technique to easily configuring the identification information for the wireless communication apparatus.

These and other objects and novel features may be readily ascertained by referring to the following description of the present specification and appended drawings.

According to an embodiment, a wireless communication apparatus includes a communication controller and an identification information setup portion. The communication controller receives first information from a first wireless communication apparatus having identification information already set. The identification information setup portion sets identification information for a subject apparatus based on the first information. The communication controller sets identification information for the subject apparatus and then transmits second information to a second wireless communication apparatus having identification information not set yet. The communication controller transmits the second information to one second wireless communication apparatus and subsequently does not transmit the second information.

The above-mentioned embodiment can easily set the identification information for the wireless communication apparatus.

BRIEF DESCRIPTION OF THE DRAWINGS

FIG. 5 is a sequence chart illustrating a process to establish communication compliant with the BLE standard;

FIG. 6B is a flowchart illustrating an example operation of the wireless communication apparatus according to the first embodiment;

FIG. 9 is a flowchart illustrating an example operation of a wireless communication apparatus according to a third embodiment.

DETAILED DESCRIPTION

Figure 1:
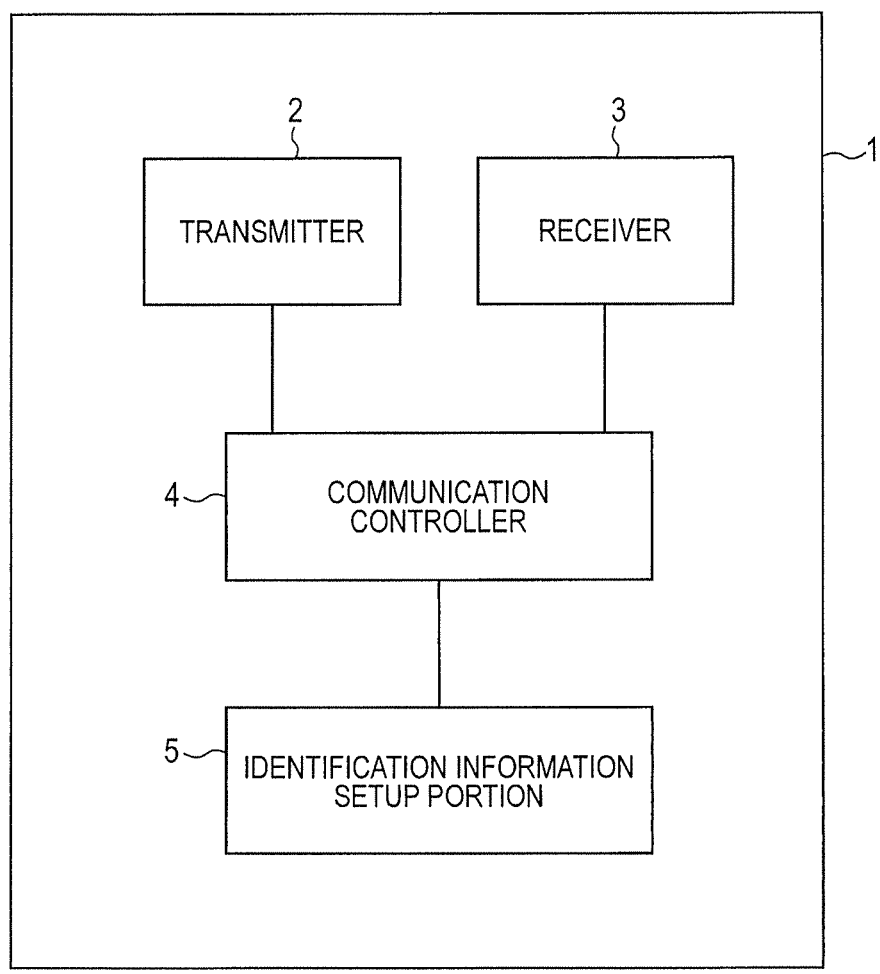
FIG. 1 is a block diagram illustrating an example configuration of a wireless communication apparatus according to an embodiment overview.

The following description and drawings are omitted and simplified as needed in order to clarify the explanation. Components illustrated in the drawings as function blocks to perform various processes can be configured as hardware by using a CPU, memory, and other circuits and can be provided as software by a program loaded into the memory. It is therefore understood by those skilled in the art that the function blocks can be embodied as hardware only, software only, or combinations of these, and are not limited thereto. In the drawings, mutually corresponding elements are designated by the same reference symbols and a duplicate explanation is omitted as needed.

The above-mentioned program is stored by using various types of non-transitory computer readable medium and can be supplied to computers. The non-transitory computer readable medium includes various types of tangible storage medium. Examples of the non-transitory computer readable medium include a magnetic recording medium (such as flexible disk, magnetic tape, and hard disk drive), a magnet-optical recording medium (such as magnet-optical disk), CD-ROM (Read Only Memory), CD-R, CD-R/W, and semiconductor memory (such as mask ROM, PROM (Programmable ROM), EPROM (Erasable PROM), flash ROM, and RAM (Random Access Memory)). The program may be supplied to computers by using various types of transitory computer readable medium. Examples of the transitory computer readable medium include electric signals, optical signals, and electromagnetic waves. The transitory computer readable medium can supply the program to computers by using wired communication paths such as an electric cable and optical fiber or wireless communication paths.

<Embodiment Overview>

The embodiment overview will be described before proceeding to explanation of embodiments. FIG. 1 is a block diagram illustrating an example configuration of a wireless communication apparatus 1 according to the embodiment overview. As illustrated in FIG. 1, the wireless communication apparatus 1 includes a transmitter 2, a receiver 3, a communication controller 4, and an identification information setup portion 5.

The transmitter 2 transmits data to other wireless communication apparatuses under control of the communication controller 4. The receiver 3 receives data from other wireless communication apparatuses under control of the communication controller 4.

The communication controller 4 provides control to perform wireless communication by using the transmitter 2 and the receiver 3. The identification information setup portion 5 sets identification information for the wireless communication apparatus 1. The communication controller 4 and the identification information setup portion 5 also perform the following processes.

The communication controller 4 establishes first communication, namely, the communication with another wireless communication apparatus (also referred to a first wireless communication apparatus) for which the identification information is already set. The communication controller 4 receives first information from the first wireless communication apparatus, namely, the information used to settle the identification information to be set for the subject apparatus (i.e., the wireless communication apparatus 1). Specifically, the first information signifies the identification information to be set for the wireless communication apparatus 1, for example.

The identification information setup portion 5 sets the identification information for the subject apparatus based on the first information received by the communication controller 4. After the identification information setup portion 5 sets the identification information for the subject apparatus, the communication controller 4 establishes second communication, namely, the communication with another wireless communication apparatus (also referred to as a second wireless communication apparatus) for which the identification information is not set yet. The communication controller 4 transmits second information to the second wireless communication apparatus. The second information is used to settle the identification information to be set for the second wireless communication apparatus. The communication controller 4 provides control not to transmit the second information to the other wireless communication apparatus after transmitting the second information to the one second wireless communication apparatus. For example, the communication controller 4 provides control to perform communication other than the communication to set the identification information after transmitting the second information to the one second wireless communication apparatus. Specifically, the second information signifies the identification information to be set for the second wireless communication apparatus, for example.

As above, the wireless communication apparatus 1 acquires information to settle the identification information to be set for the subject apparatus from the other wireless communication apparatus for which the identification information is already set. Based on this information, the identification information is set for the subject apparatus. Setting the subject apparatus is then followed by transmitting information to the other wireless communication apparatus in order to settle the identification information to be set for the other wireless communication apparatus. When a plurality of the wireless communication apparatuses 1 are available, each of these can therefore receive information, set the identification information based on the acquired information, and transmit the information. Namely, the wireless communication apparatuses 1 can chain-reactively set the identification information. An administrator therefore need not set the identification information for all the wireless communication apparatuses 1 one by one. In other words, the identification information can be easily set for the wireless communication apparatus 1. More specifically, the administrator just needs to set the identification information for any one of the wireless communication apparatuses 1. Wireless communication is used to automatically set the identification information for the remaining wireless communication apparatuses 1.

<First Embodiment>

Figure 2:
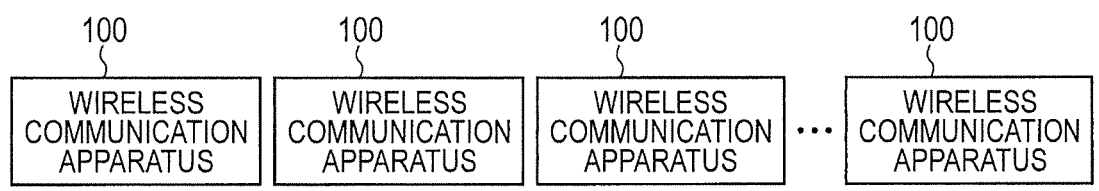
FIG. 2 is a schematic diagram illustrating an example configuration of a wireless communication system according to the embodiment.

The first embodiment will be described in detail. FIG. 2 is a schematic diagram illustrating an example configuration of a wireless communication system 10 according to the first embodiment. The wireless communication system 10 includes a plurality of wireless communication apparatuses 100. For example, the wireless communication apparatuses 100 are placed dispersedly in the space to configure the wireless communication system 10. The wireless communication apparatuses 100 perform wireless communication with each other. More specifically, the wireless communication apparatus 100 performs the wireless communication compliant with the BLE standard. The wireless communication apparatus 100 may wirelessly communicate with any unshown wireless communication apparatus other than the other wireless communication apparatuses 100. For example, the wireless communication apparatus 100 wirelessly communicates with any wireless communication apparatus that is mounted on a plurality of lighting apparatuses placed dispersedly in the space and is provided as a transmission terminal or a reception terminal using a beacon compliant with the BLE standard. The wireless communication system 10 can thereby provide any services such as data communication with a wireless communication apparatus carried by a user in the space and control over lighting apparatus operations. The provision of these services requires specifying the wireless communication apparatus 100 placed in the space by using the identification information. The embodiment then describes setting the identification information for the wireless communication apparatus 100 in the wireless communication system 10 based on so-called OTA (Over The Air). During the BLE communication, the wireless communication apparatus 100 functions as a slave instrument (advertiser) to set the identification information for the subject apparatus and functions as a master instrument (scanner or initiator) to set the identification information for the other apparatuses.

Figure 3:
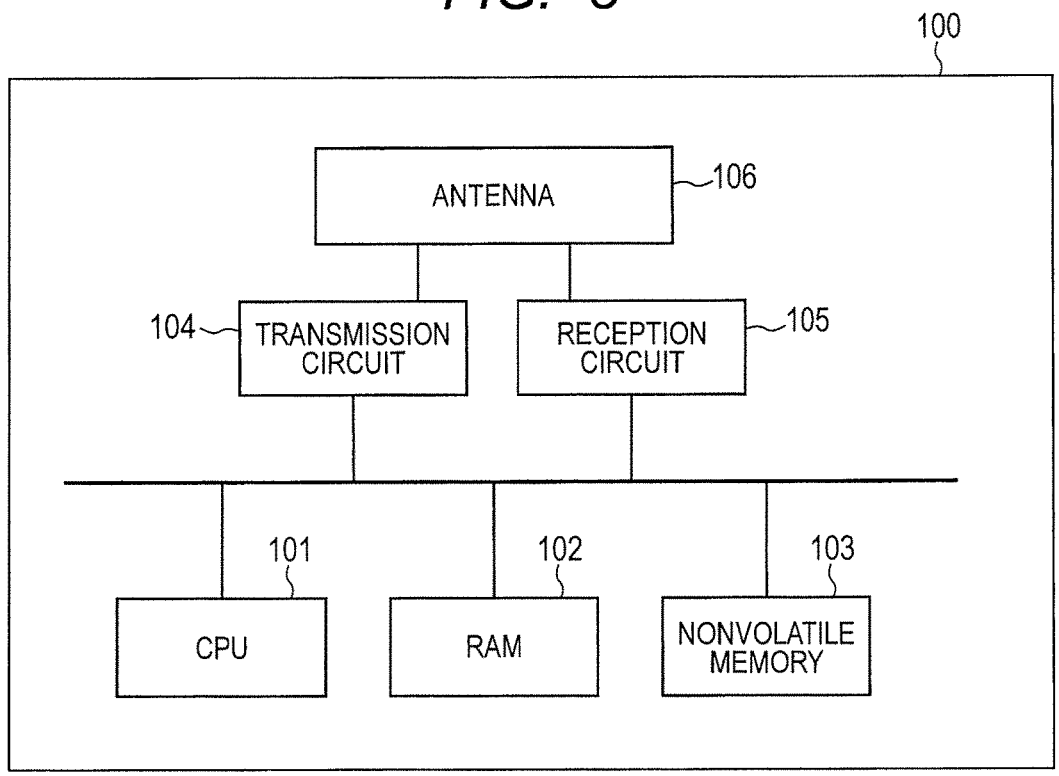
FIG. 3 is a block diagram illustrating an example hardware configuration of the wireless communication apparatus according to the embodiment.

FIG. 3 is a block diagram illustrating an example hardware configuration of the wireless communication apparatus 100. As illustrated in FIG. 3, the wireless communication apparatus 100 includes a CPU (Central Processing Unit) 101, RAM (Random Access Memory) 102, nonvolatile memory 103, a transmission circuit 104, a reception circuit 105, and an antenna 106.

The nonvolatile memory 103 stores software such as firmware. For example, the nonvolatile memory 103 stores the software to perform communication processing based on BLE. The nonvolatile memory 103 also stores the identification information to uniquely specify the wireless communication apparatus 100 in the wireless communication system 10. The nonvolatile memory 103 may be also referred to as a storage portion.

The transmission circuit 104 transmits data via the antenna 106 under control of a communication controller 153 to be described later. For example, the transmission circuit 104 modulates and amplifies transmission data and allows the antenna 106 to radiate the transmission data as a radio wave. Similarly, the reception circuit 105 uses the antenna 106 to receive data under control of the communication controller 153 to be described later. For example, the reception circuit 105 amplifies and demodulates a radio wave received at the antenna 106 and acquires the radio wave as reception data. The transmission circuit may be referred to as a transmitter. The reception circuit may be referred to as a receiver.

Figure 4:
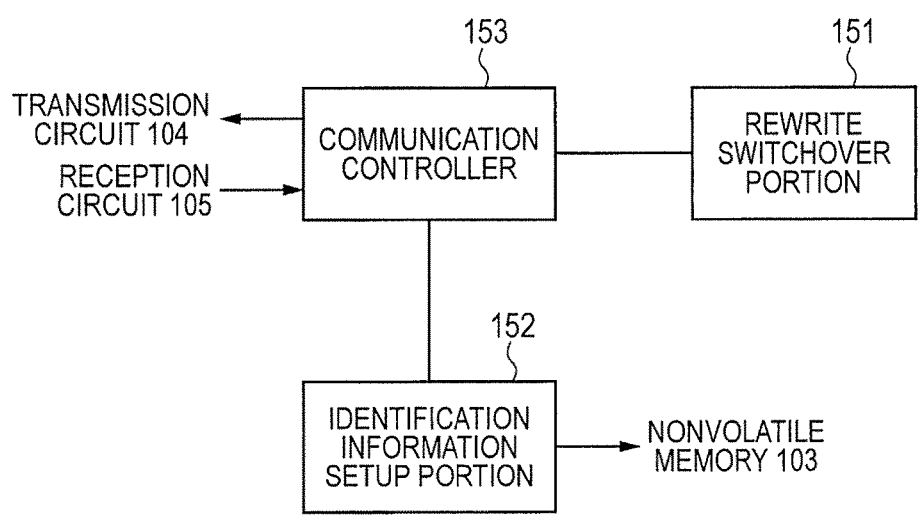
FIG. 4 is a block diagram illustrating an example function configuration of the wireless communication apparatus according to the embodiment.

FIG. 4 is a block diagram illustrating an example function configuration of the wireless communication apparatus 100. As illustrated in FIG. 4, the wireless communication apparatus 100 includes a rewrite switchover portion 151, an identification information setup portion 152, and a communication controller 153. For example, the CPU 101 executes a program to implement the rewrite switchover portion 151, the identification information setup portion 152, and the communication controller 153. The program is stored in the nonvolatile memory 103, for example.

The rewrite switchover portion 151 switches whether to rewrite a storage area (hereinafter referred to as a protective area) that stores the software and the identification information in the nonvolatile memory 103. It is necessary to inhibit the protective area in the nonvolatile memory 103 from being freely rewritten in terms of error prevention or security. The rewrite switchover portion 151 changes a rewrite enable state to a rewrite inhibit state, or vice versa. The rewrite enable state enables rewrite on the protective area in the nonvolatile memory 103. The rewrite inhibit state inhibits rewrite on the protective area in the nonvolatile memory 103. The protective area can be therefore prevented against unnecessary rewriting.

The rewrite switchover portion 151 selects the rewrite enable state when the communication controller 153 operates in ID reception mode to be described later. The rewrite switchover portion 151 selects the rewrite inhibit state when the communication controller 153 operates in ID transmission mode to be described later and in normal mode to be described later.

The identification information setup portion 152 performs a process to set the identification information for the subject apparatus. Specifically, the identification information setup portion 152 stores new identification information in the nonvolatile memory 103. The identification information setup portion 152 updates the identification information (also referred to as an initial value) already stored in the nonvolatile memory 103 with new identification information. The identification information setup portion 152 sets the identification information for the subject apparatus based on information (first information) that is received by the communication controller 153 to settle the identification information to be set for the subject apparatus.

The communication controller 153 provides control to perform communication compliant with the BLE standard by using the transmission circuit 104 and the reception circuit 105.

The description below explains a process flow to establish the communication based on the BLE standard. FIG. 5 is a sequence chart illustrating a process to establish the communication compliant with the BLE standard. As illustrated in FIG. 5, the communication based on the BLE standard performs operation from steps 10 to 13 between the wireless communication apparatuses 100 until the communication is established. The description below explains the operation to establish the communication with reference to FIG. 5.

At step 10 (S10), the wireless communication apparatus 100 functioning as an advertiser transmits an Advertising packet. The Advertising packet is used for the advertiser to search for a wireless coupling partner and includes information representing an instrument name and a function of the advertiser. The wireless communication apparatus 100 functioning as a scanner receives the transmitted Advertising packet.

At step 11 (S11), the wireless communication apparatus 100 receives the Advertising packet and transmits a SCAN Request packet to the wireless communication apparatus 100 as an origin of transmitting the Advertising packet. The SCAN Request packet allows the wireless communication apparatus 100 receiving the Advertising packet to request further information from the origin of transmitting the Advertising packet.

At step 12 (S12), the wireless communication apparatus 100 receives the SCAN Request packet and transmits a SCAN Response packet to the wireless communication apparatus 100 as the origin of transmitting the SCAN Request packet. The SCAN Response packet can include information that is not transmitted in the Advertising packet.

At step 13 (S13), the wireless communication apparatus 100 receives the SCAN Response packet and determines based on the information acquired from the SCAN Response packet whether the wireless communication apparatus 100 as the origin of transmitting the SCAN Response packet is valid as a communications partner. When the origin is valid, the wireless communication apparatus 100 receiving the SCAN Response packet transmits a Connect Request packet to the wireless communication apparatus 100 as the origin of transmitting the SCAN Response packet. The Connect Request packet requests establishment of the communication.

At step 14 (S14), the wireless communication apparatus 100 as the origin of transmitting the SCAN Response packet receives the SCAN Request packet to establish the BLE-based communication between two wireless communication apparatuses 100. After establishing the communication, the wireless communication apparatus 100 can disconnect the communication by transmitting a disconnect packet to the communications partner.

The communication controller 153 establishes the communication by providing control so as to perform the operation illustrated in FIG. 5. The communication controller 153 provides control to perform the communication compliant with the BLE standard in ID reception mode, ID transmission mode, or normal mode.

The ID reception mode is used to receive information that settles the identification information to be set for the subject apparatus from the other wireless communication apparatus 100. In the ID reception mode, the communication controller 153 functions as an advertiser. In the ID reception mode, the communication controller 153 provides control to transmit a notification to the other wireless communication apparatus 100 during a process to establish the communication such that the notification limits the communication to the identification information setup. Specifically, the communication controller 153 provides control to transmit a SCAN Response packet in response to the SCAN Request packet from the other wireless communication apparatus 100 while the SCAN Response packet includes a notification indicating that the condition to establish the communication is capability of transmitting information about the identification information. In this manner, the wireless communication apparatus 100 in the ID reception mode provides the condition to establish the wireless communication by transmitting SCAN Response in response to SCAN Request.

The ID transmission mode is used to transmit information to another wireless communication apparatus 100 such that the information settles the identification information to be set for the other wireless communication apparatus. In the ID transmission mode, the communication controller 153 functions as a scanner. In the ID transmission mode, the communication controller 153 establishes communication only for the purpose of identification information setup. In the ID transmission mode, the communication controller 153 determines that the wireless communication apparatus 100 as an origin of transmitting the SCAN Response packet is valid as a communications partner when the received SCAN Response packet includes the notification indicating that the condition to establish the communication is capability of transmitting information about the identification information and when the information about the identification information can be transmitted. In the ID transmission mode, the communication controller 153 therefore transmits a Connect Request packet when the received SCAN Response packet includes the notification indicating that the condition to establish the communication is capability of transmitting information about the identification information and when the information about the identification information can be transmitted. The communication controller 153 transmits the Connect Request packet determining that the information about the identification information can be transmitted when the identification information is already set for the subject apparatus. In the ID transmission mode, however, the communication controller 153 transmits no Connect Request packet when the received SCAN Response packet does not include such a notification and when the information about the identification information cannot be transmitted.

The normal mode is used to perform communication other than transmission and reception of the information about the identification information. For example, the normal mode performs communication needed to actualize a service provided by the wireless communication system 10. In the normal mode, the communication controller 153 functions as an advertiser or a scanner. Suppose that the communication controller 153 functions as an advertiser in the normal mode. The communication controller 153 then provides control not to transmit a notification to the other wireless communication apparatus 100 during a process to establish the communication such that the notification limits the communication to the identification information setup. Specifically, the communication controller 153 transmits a SCAN Response packet in response to the SCAN Request packet from the other wireless communication apparatus 100 such that the SCAN Response packet does not notify that the condition to establish the communication is capability of transmitting the information about the identification information. Suppose that the communication controller 153 functions as a scanner in the normal mode. The communication controller 153 then provides control not to respond to a SCAN Response packet that includes the notification about limitation on the communication to the identification information setup.

In the ID reception mode, the communication controller 153 establishes first communication, namely, the communication with the wireless communication apparatus 100 having the identification information already set and receives first information namely, the information to settle the identification information to be set for the subject apparatus, from this wireless communication apparatus 100. In order to establish the first communication as above, the communication controller 153 transmits the Advertising packet. The wireless communication apparatus 100 receives the Advertising packet and transmits the SCAN Request packet. In response to the SCAN Request packet, the communication controller 153 transmits the SCAN Response packet notifying that the condition to establish the communication is capability of transmitting the information about the identification information.

According to the embodiment, the communication controller 153 starts a process to establish the first communication in the ID reception mode when the subject apparatus receives an instruction to start the subject apparatus from outside. According to the embodiment, the process to establish the first communication starts at the time to receive the instruction to start the subject apparatus. The process to establish the first communication may start at the time when the subject apparatus receive any specified instruction from outside other than the start instruction. For example, the specified instruction may be given by pressing an unshown switch provided for the wireless communication apparatus 100 or by other methods.

The communication controller 153 uses the ID transmission mode to establish second communication, namely, the communication with the wireless communication apparatus 100 for which no identification information is set after the identification information setup portion 152 sets the identification information for the subject apparatus. The communication controller 153 transmits second information, namely, the information to settle the identification information to be set for the wireless communication apparatus 100, to the wireless communication apparatus 100. As above, the communication controller 153 establishes the second communication when receiving the SCAN Response packet notifying that the condition to establish the communication is capability of transmitting the information about the identification information, the SCAN Response packet being received from the wireless communication apparatus 100, and when the information about the identification information can be transmitted.

The communication controller 153 transmits the second information to one wireless communication apparatus 100 and thereafter does not transmit the second information to the other wireless communication apparatuses 100 except for the wireless communication apparatus 100. Specifically, according to the embodiment, the communication controller 153 proceeds to the normal mode after transmitting the second information to one wireless communication apparatus 100. According to the embodiment, the communication controller 153 therefore operates in the ID reception mode, the ID transmission mode, and then the normal mode in order after the wireless communication apparatus 100 starts.

The description below explains the first information and the second information described above transmitted and received by the communication controller 153. According to the embodiment, the first information corresponds to the identification information to be set for the wireless communication system 10 that receives the first information. The second information corresponds to the identification information to be set for the wireless communication system 10 that receives the second information. According to the embodiment, the identification information is represented as a value of predetermined data type. In more detail, the identification information is a value belonging to the data type that predetermines a sequence of values. Values belonging to this data type include numeric values and alphabetic characters, for example. Namely, the predetermined data type just needs to be capable of uniquely specifying identification information sequentially next to given identification information.

According to the embodiment, the identification information setup portion 152 sets the identification information for the subject apparatus so that the identification information corresponds to a value sequentially next to the value of the identification information set for the wireless communication apparatus 100 as a transmission origin of the first information. For example, suppose the identification information is represented as a numeric value and "0003" is assigned to the wireless communication apparatus 100 as the transmission origin of the first information. The identification information setup portion 152 then sets "0004" as the identification information for the subject apparatus. In this example, the wireless communication system 10 specifies that a value resulting from incrementing a given value by one be sequentially next to the given value. Suppose the wireless communication system 10 specifies that a value resulting from decrementing a given value by one be sequentially next to the given value. In this case, the identification information setup portion 152 may therefore set "002."

According to the embodiment, the communication controller 153 transmits the second information, namely, a value sequentially next to the value of the identification information set for the subject apparatus. In the context of the above-mentioned example, identification number "0003" is set for the wireless communication apparatus 100. The communication controller 153 of this wireless communication apparatus 100 transmits "0004" as the second information to the other wireless communication apparatus 100 in the ID transmission mode. The other wireless communication apparatus 100 receives this information as the first information. The identification information setup portion 152 of the other wireless communication apparatus 100 sets "0004" received as the first information to be the identification information.

According to the above-mentioned description, the first information corresponds to the identification information to be set for the wireless communication apparatus 100 to receive the first information and the second information corresponds to the identification information to be set for the wireless communication apparatus 100 to receive the second information. However, the first information may correspond to the identification information set for the wireless communication apparatus 100 as the origin of transmitting the first information and the second information may correspond to the identification information set for the wireless communication apparatus 100 as the origin of transmitting the second information. Namely, the communication controller 153 may transmit the value of the identification information set for the subject apparatus as the second information. In this case, the identification information setup portion 152 finds a value sequentially next to the value of the identification information received as the first information and sets the sequentially next value as the identification information for the subject apparatus.

Figure 6A:
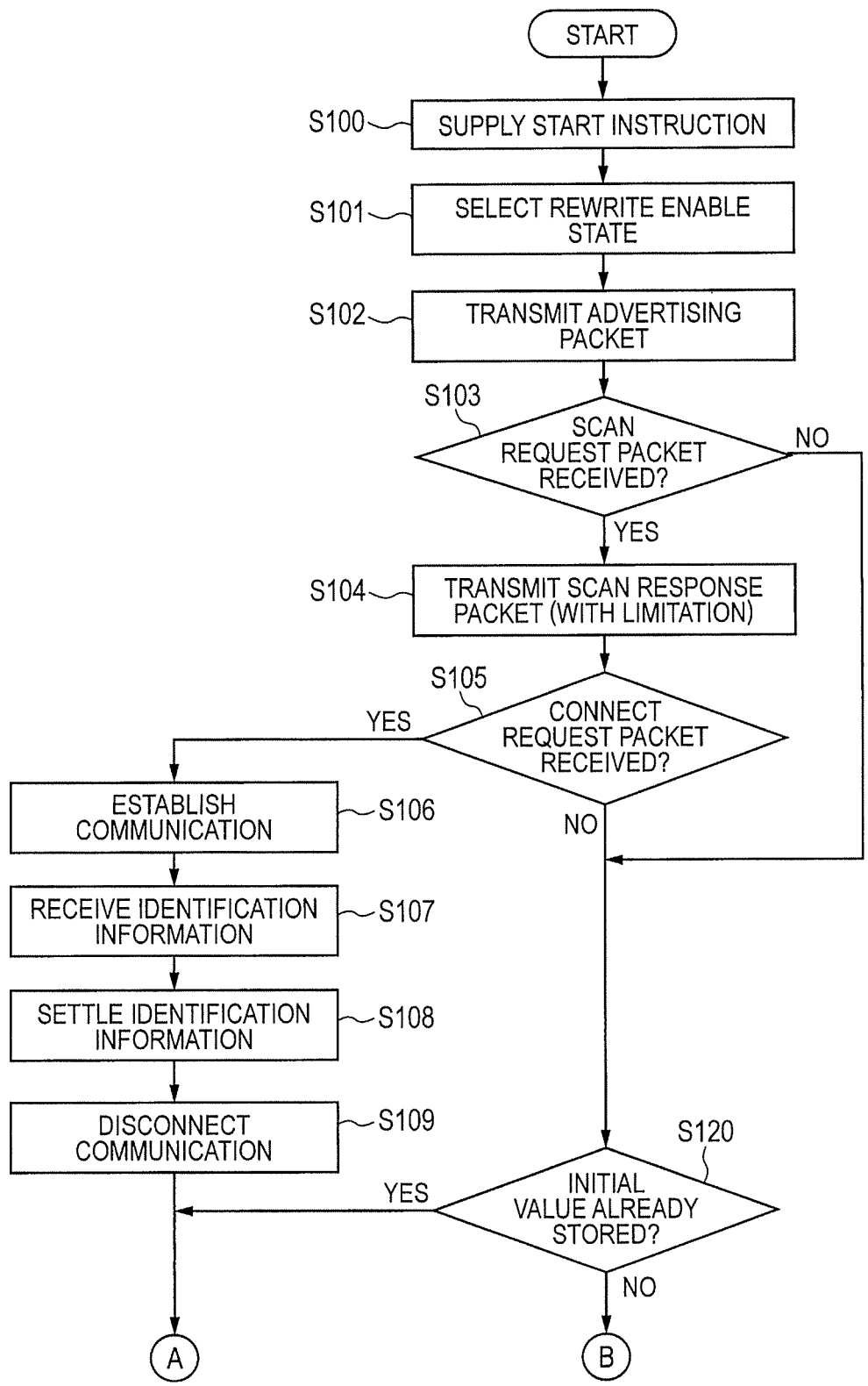
FIG. 6A is a flowchart illustrating an example operation of a wireless communication apparatus according to a first embodiment.

The description below explains operation of the wireless communication apparatus 100 in detail with reference to a flowchart. FIGS. 6A and 6B are flowcharts illustrating an example operation of the wireless communication apparatus 100. The description below explains operation of the wireless communication apparatus 100 with reference to FIGS. 6A and 6B.

At step 100 (S100), a start instruction is given to the wireless communication apparatus 100 to start the wireless communication apparatus 100. The communication controller 153 of the wireless communication apparatus 100 operates in the ID reception mode immediately after the startup.

At step 101 (S101), the rewrite switchover portion 151 selects the rewrite enable state. Namely, the wireless communication apparatus 100 is capable of rewriting the protective area in the nonvolatile memory 103.

At step 102 (S102), the transmission circuit 104 transmits an Advertising packet according to the control from the communication controller 153. Step 102 corresponds to step 10 in FIG. 5.

At step 103 (S103), the communication controller 153 determines whether the reception circuit 105 receives a SCAN Request packet transmitted from the other wireless communication apparatus 100. The process proceeds to step 104 if the SCAN Request packet is received within a predetermined time (corresponding to step 11 in FIG. 5). The process proceeds to step 120 if the SCAN Request packet is not received within a predetermined time.

At step 104 (S104), the transmission circuit 104 follows the control from the communication controller 153 and transmits a SCAN Response packet including the notification about limitation on the communication to the identification information setup to the wireless communication apparatus 100 as the transmission origin of the SCAN Request packet. Step 104 corresponds to step 12 in FIG. 5.

At step 105 (S105), the communication controller 153 determines whether the reception circuit 105 receives a Connect Request packet transmitted from the other the wireless communication apparatus 100. The process proceeds to step 106 if the Connect Request packet is received within a predetermined time (corresponding to step 13 in FIG. 5). The process proceeds to step 120 if the Connect Request packet is not received within a predetermined time.

At step 106 (S106), the communication controller 153 establishes the BLE-based communication with the wireless communication apparatus 100 as the transmission origin of the Connect Request packet. Step 106 corresponds to step 14 in FIG. 5.

At step 107 (S107), the reception circuit 105 receives the identification information transmitted from the wireless communication apparatus 100 as the communications partner. Namely, the first information is received.

At step 108 (S108), the identification information setup portion 152 stores the identification information received at step 107 in the nonvolatile memory 103. Namely, this step automatically sets the identification information.

At step 109 (S109), the transmission circuit 104 follows the control from the communication controller 153 and transmits a disconnect packet to the communications partner. This disconnects the communication.

At step 110 (S110), the communication controller 153 proceeds to the ID transmission mode from the ID reception mode. The rewrite switchover portion 151 selects the rewrite inhibit state. Namely, the wireless communication apparatus 100 is inhibited from rewriting the protective area in the nonvolatile memory 103.

At step 111 (S111), the communication controller 153 determines whether the reception circuit 105 receives the Advertising packet transmitted from the other wireless communication apparatus 100. The process proceeds to step 112 if the Advertising packet is received within a specified time. The process proceeds to step 118 if the Advertising packet is not received within a specified time. Namely, the normal mode is selected as will be described later because the communication for identification information setup is impossible.

At step 112 (S112), the transmission circuit 104 transmits a SCAN Request packet under control of the communication controller 153. The SCAN Request packet is thereby transmitted to any wireless communication apparatuses 100 as the transmission origin of the Advertising packet.

At step 113 (S113), the communication controller 153 determines whether the reception circuit 105 receives a SCAN Response packet including the notification about limitation on the communication to the identification information setup from the wireless communication apparatus 100 as a transmission destination of the SCAN Request packet. The process proceeds to step 114 if such a SCAN Response packet is received within a predetermined time. The process proceeds to step 118 if such a SCAN Response packet is not received within a predetermined time. Namely, the normal mode is selected as will be described later because the communication for the identification information setup is impossible.

At step 114 (S114), the transmission circuit 104 follows the control from the communication controller 153 and transmits a SCAN Request packet to the wireless communication apparatus 100 as the transmission origin of the SCAN Response packet.

At step 115 (S115), the communication controller 153 thereby establishes the BLE-based communication with the wireless communication apparatus 100 as the transmission destination of the SCAN Response packet.

At step 116 (S116), the transmission circuit 104 follows the control from the communication controller 153 and transmits the identification information to the wireless communication apparatus 100 as the communications partner. Namely, the second information is transmitted. The communication controller 153 then transmits a value sequentially next to the value of the identification information set for the subject apparatus. The identification information is thereby set for the wireless communication apparatus 100 as the communications partner.

At step 117 (S117), the transmission circuit 104 follows the control from the communication controller 153 and transmits a disconnect packet to the communications partner. This disconnects the communication.

At step 118 (S118), the communication controller 153 proceeds to the normal mode. The rewrite switchover portion 151 therefore selects the rewrite inhibit state. Namely, the wireless communication apparatus 100 is inhibited from rewriting the protective area in the nonvolatile memory 103.

At step 119 (S119), the wireless communication apparatus 100 performs a specified operation. Namely, the wireless communication apparatus 100 performs an operation other than the operation to set the identification information. This operation can include the communication with other wireless communication apparatuses in the normal mode. At step 119, the wireless communication apparatus 100 functions as an advertiser in the normal mode, for example.

At step 120 (S120), the identification information setup portion 152 determines whether the identification information is already set for the subject apparatus. Namely, the identification information setup portion 152 determines whether the nonvolatile memory 103 already stores the initial value as the identification information. For example, an administrator previously sets the identification information for any one of the wireless communication apparatuses 100 configuring the wireless communication system 10. The nonvolatile memory 103 therefore stores the initial value as the identification information for at least one of the wireless communication apparatuses 100. The process proceeds to step 110 if the initial value is stored. In this case, this wireless communication apparatus 100 therefore performs operation to notify the identification information for the other wireless communication apparatuses 100. The process proceeds to step 118 if the initial value is not stored because the communication for the identification information setup is impossible. Namely, the wireless communication apparatus 100 changes to the normal mode.

There have been described the example operations of the wireless communication apparatus 100. As above, the identification information is predetermined for at least one of the wireless communication apparatuses 100 configuring the wireless communication system 10. According to the embodiment, the wireless communication apparatus 100 having the predetermined identification information functions as a start point to set the identification information for the remaining wireless communication apparatuses 100. No identification information is set for the other wireless communication apparatuses 100 when the wireless communication apparatus 100 as the start point starts. The wireless communication apparatuses 100 other than the wireless communication apparatus 100 as the start point therefore do not function in the ID transmission mode. When the wireless communication apparatus 100 as the start point starts, the Advertising packet is transmitted at step 102 and then the process proceeds to step 120. The initial value is set for the wireless communication apparatus 100 as the start point. The process therefore proceeds to step 110. Namely, the wireless communication apparatus 100 as the start point functions as the ID transmission mode. However, the process proceeds from step 100 to step 109 in order in the wireless communication apparatus 100 for which the identification information is automatically set from the beginning. The wireless communication apparatus 100 as the start point functions as the normal mode when the identification information is automatically set for one of the other wireless communication apparatuses 100. The wireless communication apparatus 100 for which the identification information is automatically set from the beginning functions as the ID transmission mode. Namely, this wireless communication apparatus 100 performs the process at step 109 that then proceeds from step 110 to step 117 in order. The wireless communication apparatus 100 functions as the normal mode when the identification information is newly automatically set for the other wireless communication apparatus 100. In this manner, the identification information is chain-reactively set for the wireless communication apparatuses 100.

Figure 7:
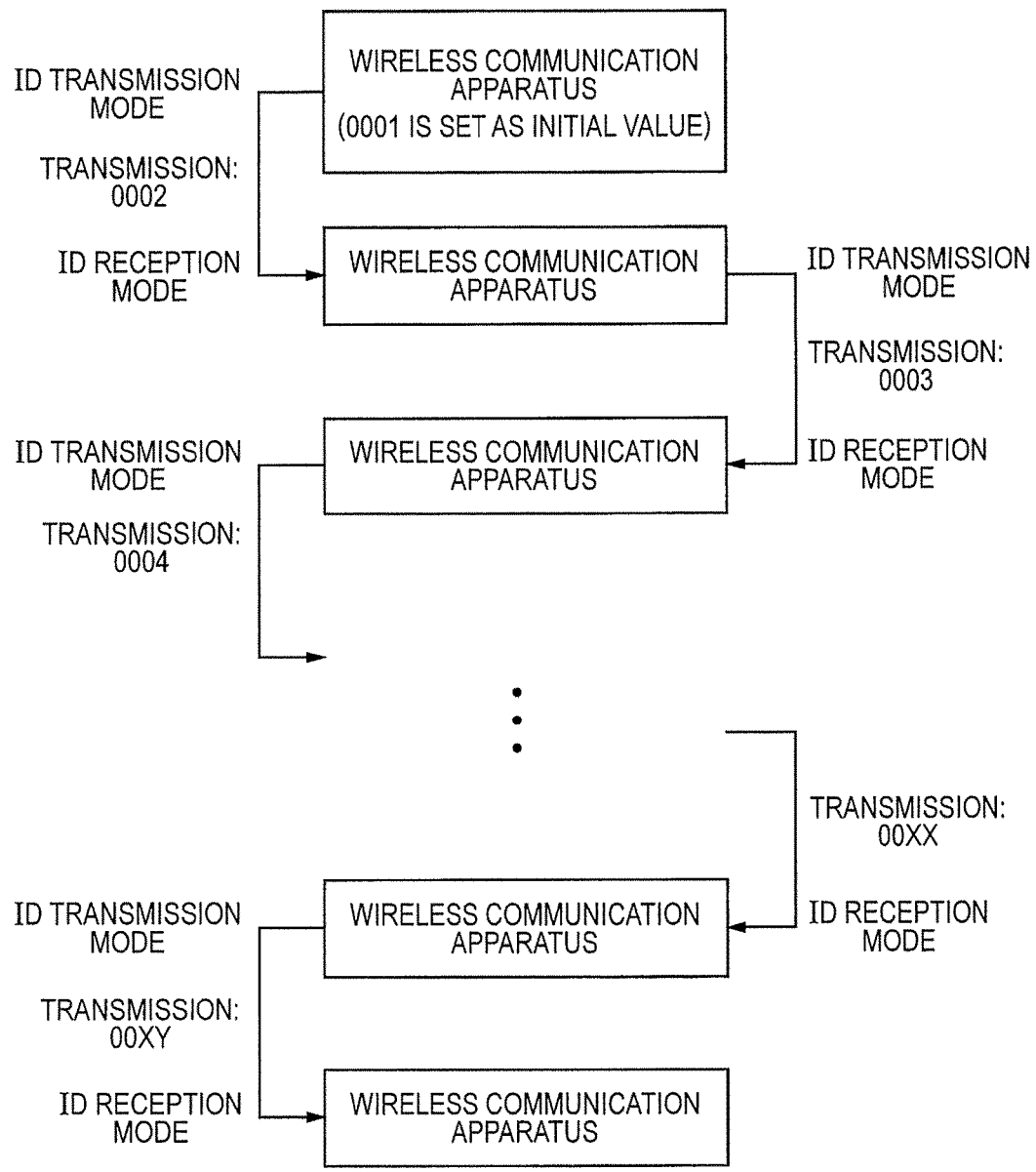
FIG. 7 is a schematic diagram illustrating identification information setup.

As illustrated in FIG. 7, each wireless communication apparatus 100 receives the identification information for the subject apparatus from the wireless communication apparatus 100 having the identification information already set and transmits the identification information for this wireless communication apparatus to the wireless communication apparatus 100 for which the identification information is not set yet. The identification information is therefore set automatically and chain-reactively. An administrator need not set the identification information for all the wireless communication apparatuses 100 one by one. The identification information can be set easily for the wireless communication apparatus 100. As above, the wireless communication apparatus 100 sets the identification information by performing communication in compliance with the BLE standard. The identification information can be therefore easily set for the wireless communication apparatus 100 based on the BLE standard.

According to the embodiment, the process corresponding to the flowchart in FIG. 7 starts at the time point when a specified instruction is received from outside. The sequence of setting the identification information for the wireless communication apparatus 100 can therefore correspond to the sequence of supplying the specified instruction. This can therefore facilitate the management of correspondence relation between the wireless communication apparatus 100 and the identification information. The specified instruction corresponds to a start instruction and the identification information can be therefore set just by performing a startup operation after the wireless communication apparatus 100 is installed.

According to the embodiment, the identification information is a value belonging to the data type that predetermines a sequence of values. Namely, each wireless communication apparatus 100 transmits a value sequentially next to the value of the identification information set for the subject apparatus to the wireless communication apparatus 100 for which the identification information is not set yet. Each wireless communication apparatus 100 is therefore assigned the identification information including the value corresponding to the order of supplying a specified instruction. It is possible to more easily manage correspondence relation between the wireless communication apparatus 100 and the identification information. For example, suppose the wireless communication apparatuses 100 configuring the wireless communication system 10 are placed dispersedly in line in the space. Sequentially starting the wireless communication apparatuses 100 from the wireless communication apparatus 100 at the end assigns numbers incrementing in ascending order to the wireless communication apparatuses 100 sequentially from the wireless communication apparatus 100 at the end, for example. This can easily recognize the correspondence relation between the position of placing each wireless communication apparatus 100 and each identification information.

According to the embodiment as above, the identification information is assumed to represent a value belonging to the data type that predetermines a sequence of values. However, the identification information is not limited thereto but may represent a value belonging to any data type.

<Second Embodiment>

The second embodiment will be described. The embodiment can appropriately set the identification information even if no identification information is notified from the other wireless communication apparatuses 100. Suppose the identification information has been set for the wireless communication apparatuses 100 configuring the wireless communication system 10 and the new wireless communication apparatus 100 is replaced or added to be a constituent component of the wireless communication system 10. In such a case, the embodiment provides an identification information setup method for the new wireless communication apparatus 100. The description below explains differences from the first embodiment.

Suppose the identification information setup portion 152 according to the second embodiment successfully receives the first information from the wireless communication apparatus 100 having the identification information already set. In this case, similarly to the first embodiment, the identification information setup portion 152 sets the identification information for the subject apparatus, namely, a value sequentially next to the value of the identification information set for this wireless communication apparatus 100. However, the identification information setup portion 152 according to the second embodiment may fail to receive the first information from the wireless communication apparatus 100 having the identification information already set. In this case, the identification information setup portion 152 settles the identification information for the subject apparatus based on the identification information that is included in an Advertising packet that is transmitted by the other wireless communication system 10 and is set for this wireless communication apparatus 100. According to the embodiment, the communication controller 153 transmits an Advertising packet in the normal mode by inserting the identification information for the subject apparatus into the Advertising packet. For example, the identification information is inserted into an advertising data area of the payload for the Advertising packet. According to the embodiment, each wireless communication apparatus 100 transmits the Advertising packet including the identification information for the subject apparatus at step 119 above.

When failed to receive the first information, the identification information setup portion 152 settles the identification information for the subject apparatus based on the identification information included in the received Advertising packet as follows, for example. The identification information setup portion 152 searches for missing identification information based on the identification information included in the received Advertising packet and settles this missing identification information as the identification information for the subject apparatus.

The identification information is settled in this manner to enable the following setting. Suppose the wireless communication apparatuses 100 configuring the wireless communication system 10 are placed dispersedly in line in the space and the method described in the first embodiment is used to set the identification information for the wireless communication apparatuses. The following assumes that one of the wireless communication apparatuses 100 is replaced by the new wireless communication system 10 because of a failure. As an example, the failed wireless communication apparatus 100 is assumed to be assigned identification information "0003." The new wireless communication apparatus 100 is assumed to be placed at the same installation position as the failed wireless communication apparatus 100. The new wireless communication apparatus 100 then receives an Advertising packet from the adjacent wireless communication apparatus 100. Specifically, Advertising packets to be received include identification information "0002" and identification information "0004," for example. The identification information setup portion 152 therefore searches for missing identification information from the identification information included in these Advertising packets. In this example, "0003" is specified to be missing. The new wireless communication apparatus 100 therefore sets "0003" as the identification information for the subject apparatus. The wireless communication apparatus 100 after replacement can thereby easily inherit the identification information set for the wireless communication apparatus 100 before replacement.

When failed to receive the first information, the identification information setup portion 152 may use other methods to specify the identification information for the subject apparatus. When failed to receive the first information, the identification information setup portion 152 may specify the identification information not overlapping with any of all the identification information already set based on the identification information included in the received Advertising packet and may settle the specified identification information as the identification information for the subject apparatus. Since the identification information is settled in this manner, new identification information not overlapping any existing wireless communication apparatus 100 can be automatically provided when the new wireless communication apparatus 100 is added to the wireless communication system 10 that has completely set the identification information for the wireless communication apparatuses 100.

Figure 8:
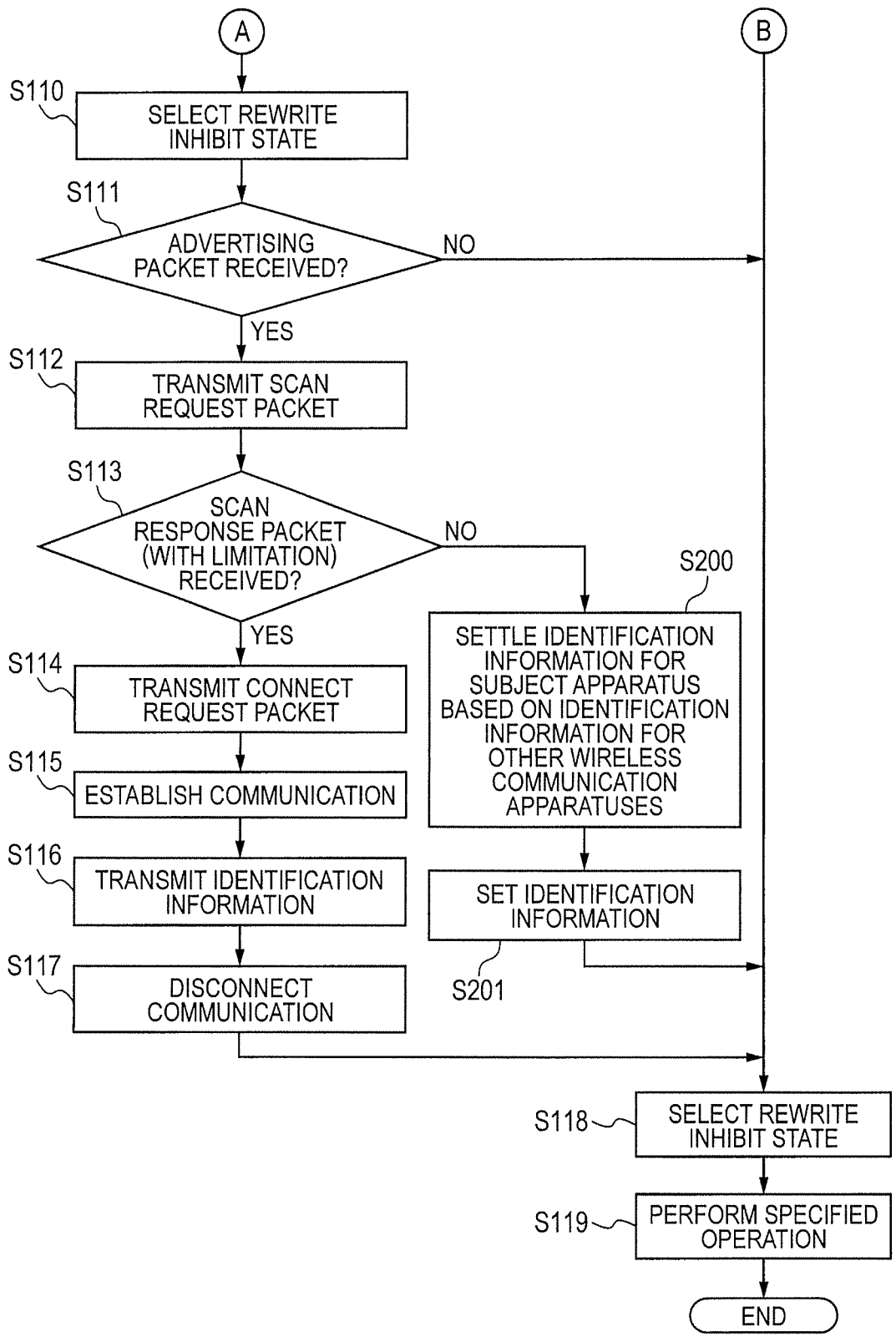
FIG. 8 is a flowchart illustrating an example operation of a wireless communication apparatus according to a second embodiment.

The description below explains operation of the wireless communication apparatus 100 according to the second embodiment. FIG. 8 is a flowchart illustrating an example operation of the wireless communication apparatus 100 according to the second embodiment. The operation of the wireless communication apparatus 100 according to the second embodiment differs from the operation of the wireless communication apparatus 100 according to the first embodiment in that the operation illustrated by the flowchart in FIG. 6B is replaced by the operation illustrated by the flowchart in FIG. 8. The flowchart in FIG. 8 differs from the flowchart in FIG. 6B in that steps 200 and 201 are added. In the wireless communication apparatus 100 according to the first embodiment, the process proceeds to step 118 if it is determined at step 113 that the SCAN Response packet is not received. In the wireless communication apparatus 100 according to the second embodiment, however, the process proceeds to step 200 as illustrated in FIG. 8.

The embodiment assumes that temporary identification information is set for the wireless communication apparatus 100 to be newly introduced to the wireless communication system 10 in which the identification information is already set for all the wireless communication apparatuses 100. The process therefore proceeds in the order of steps 100, 101, 102, 103, 104, 105, 120, 110, 111, 112, 113, and 200 on the wireless communication apparatus 100 to be newly introduced. The embodiment assumes the temporary identification information to be set for the newly introduced wireless communication apparatus 100 in order to minimize a change in the operation flow according to the first embodiment. However, the temporary identification information need not be always set in the other operation flows ensuring that the newly introduced wireless communication apparatus 100 performs step 200.

At step 200 (S200), the identification information setup portion 152 settles the identification information for the subject apparatus based on the identification information for the other wireless communication apparatuses 100 included in the Advertising packet received at step 111.

At step 201 (S201), the identification information setup portion 152 sets the identification information settled at step 200 as the identification information for the subject apparatus. After step 210, the process proceeds to step 118.

According to the embodiment, the identification information setup portion 152 settles the identification information for the subject apparatus based on the identification information for the other wireless communication apparatuses 100 included in the Advertising packet. The embodiment can therefore automatically set the appropriate identification information when the new wireless communication apparatus 100 is introduced to the wireless communication system 10 in which the identification information is already set for all the wireless communication apparatuses 100.

<Third Embodiment>

The third embodiment will be described. The embodiment differs from the first embodiment in that a coupling destination is settled based on the reception strength when an Advertising packet is received from a plurality of wireless communication apparatuses 100 for which the identification information is not set yet. Namely, the communication controller 153 according to the embodiment selects the origin of transmitting a signal corresponding to the largest reception strength as a communications partner out of the wireless communication apparatuses 100 for which the identification information is not set yet during communication with the wireless communication apparatus 100 for which the identification information is not set yet (namely, communication established in the ID transmission mode) on condition that the communication is performed after completion of setting the identification information for the subject apparatus.

FIG. 9 is a flowchart illustrating an example operation of the wireless communication apparatus 100 according to the third embodiment. The operation of the wireless communication apparatus 100 according to the third embodiment differs from the operation of the wireless communication apparatus 100 according to the first embodiment in that the operation illustrated by the flowchart in FIG. 6B is replaced by the operation illustrated by the flowchart in FIG. 9. The flowchart in FIG. 9 differs from the flowchart in FIG. 6B in that step 112 is replaced by step 300 and step 301 is added.

The embodiment performs step 300 instead of step 112 to transmit a SCAN Request packet in the ID transmission mode. At step 300 (S300), the communication controller 153 confirms the reception strength of the Advertising packet received at step 111 and specifies the wireless communication apparatus 100 that transmits an Advertising packet corresponding to the largest reception strength. Specifically, the communication controller 153 specifies the wireless communication apparatus 100 as an origin of transmitting the signal corresponding to the maximum RSSI (Received Signal Strength Indication). The communication controller 153 allows the transmission circuit 104 to transmit a SCAN Request packet to the specified wireless communication apparatus 100. After step 300, the process proceeds to step 113.

At step 113 (S113) as above, the communication controller 153 determines whether to have received a SCAN Response packet including the notification of limiting the communication to the identification information setup from the wireless communication apparatus 100 as a destination of transmitting the SCAN Request packet. The process proceeds to step 114 if such a SCAN Response packet is received within a predetermined time. In this case, the identification information is therefore set for the wireless communication apparatus 100 that belongs to the wireless communication apparatuses 100 not assigned the identification information in the ID reception mode and is most adjacent to the subject apparatus. This is because the reception strength corresponds to a distance between the apparatuses. However, the process proceeds to step 301 if failed to receive a SCAN Response packet including the notification of limiting the communication to the identification information setup within a predetermined time. The wireless communication apparatus 100 specified at step 300 is likely to be already assigned the identification information. In such a case, the wireless communication apparatus 100 transmits a SCAN Response packet in the normal mode. The process at step 113 therefore does not receive a SCAN Response packet including the notification of limiting the communication to the identification information setup. In this case, the process therefore proceeds to step 301.

At step 301 (S301), the communication controller 153 determines whether there is the wireless communication apparatus 100 to transmit an Advertising packet other than the wireless communication apparatus 100 as a destination of transmitting the SCAN Request packet at step 300. The process proceeds to step 118 if there is no other wireless communication apparatus 100 to transmit an Advertising packet. Namely, it is impossible to perform the communication for the identification information setup and the normal mode is therefore selected as will be described later. The process returns to step 300 if there is any other wireless communication apparatus 100 to transmit an Advertising packet. If the process returns to step 300, the communication controller 153 specifies the wireless communication system 100 that is not selected as a destination of transmitting the SCAN Request packet yet and corresponds to the largest reception strength. As above, the embodiment sets the identification information for the wireless communication apparatus 100 that enters the ID reception mode and is nearest to the subject apparatus.

As above, the embodiment can sequentially set the identification information from the wireless communication apparatus 100 nearest to the wireless communication apparatus 100 placed in the ID reception mode. This advantage especially takes effect in the following case. For example, a plurality of wireless communication apparatuses 100 placed dispersedly in line can be assigned identification numbers in ascending or descending order from the end by sequentially issuing a start instruction from the end. However, identification numbers in ascending or descending order may not be assigned if the start instruction is issued to the wireless communication apparatuses 100 at the same timing. However, as above, the embodiment can set the identification information from the wireless communication apparatus 100 nearest to the wireless communication apparatus 100 in the ID reception mode. Identification numbers in ascending or descending order can be therefore assigned along a sequence of placements even if the wireless communication apparatuses 100 start simultaneously.

The embodiment can be combined with the second embodiment. For example, the third embodiment can be combined with the second embodiment by modifying the process so as to perform steps 200 and 201 if it is determined at step 301 that there is no other wireless communication apparatus 100 to transmit an Advertising packet (No at step 301) in the flowchart illustrated in FIG. 9.

While there have been described the specific embodiments of the invention made by the inventors, it is to be distinctly understood that the present invention is not limited to the above-mentioned embodiments and may be embodied in various modifications without departing from the spirit and scope of the invention.

What is claimed is:

1. A wireless communication apparatus comprising:
   a transmitter;
   a receiver;
   a communication controller that provides control to perform wireless communication by using the transmitter and the receiver; and
   an identification information setup portion that sets identification information,
   wherein the communication controller establishes first communication with a first wireless communication apparatus having identification information already set and receives first information which is information to settle identification information to be set for a subject apparatus, from the first wireless communication apparatus,
   wherein the identification information setup portion sets identification information for a subject apparatus based on the first information received by the communication controller,
   wherein, after the identification information setup portion sets identification information for a subject apparatus, the communication controller establishes second communication which is communication with a second wireless communication apparatus having identification information not set yet, and transmits second information which is information to settle identification information to be set for the second wireless communication apparatus, and
   wherein the communication controller does not transmit the second information after transmitting the second information to the second wireless communication apparatus.

2. The wireless communication apparatus according to claim 1,
   wherein the wireless communication complies with a Bluetooth (registered trademark) Low Energy standard,
   wherein the communication controller transmits an Advertising packet to establish the first communication and transmits a specified SCAN Response packet in response to a SCAN Request packet from the first wireless communication apparatus that receives the Advertising packet,
   wherein the communication controller receives the specified SCAN Response packet from the second wireless communication apparatus and establishes the second communication when information about identification information can be transmitted, and
   wherein the specified SCAN Response packet notifies that a capability of transmitting information about identification information is a condition to establish communication.

3. The wireless communication apparatus according to claim 2,
   wherein the identification information is represented as a value of predetermined data type,
   wherein, when the first information is successfully received from the first wireless communication apparatus, the identification information setup portion sets identification information for a subject apparatus which is a value sequentially next to a value of identification information set for the first wireless communication apparatus, and
   wherein, when the first information is unsuccessfully received from the first wireless communication apparatus, the identification information setup portion settles identification information for a subject apparatus and sets identification information for a subject apparatus based on identification information that is included in an Advertising packet transmitted by another wireless communication apparatus and is set for the other wireless communication apparatus.

4. The wireless communication apparatus according to claim 3,
   wherein, when the first information is unsuccessfully received from the first wireless communication apparatus, the identification information setup portion searches for missing identification information and settles the missing identification information as identification information for a subject apparatus based on identification information that is included in an Advertising packet transmitted by another wireless communication apparatus and is set for the other wireless communication apparatus.

5. The wireless communication apparatus according to claim 3,
   wherein, when the first information is unsuccessfully received from the first wireless communication apparatus, the identification information setup portion specifies identification information not overlapping with all already set identification information and settles the specified identification information as identification information for a subject apparatus based on identification information that is included in an Advertising packet transmitted by another wireless communication apparatus and is set for the other wireless communication apparatus.

6. The wireless communication apparatus according to claim 1,
wherein the communication controller establishes the second communication by selecting the second wireless communication apparatus as a communication partner such that the second wireless communication apparatus belongs to a plurality of the second wireless communication apparatuses and is available as an origin of transmitting a signal corresponding to a largest reception strength.

7. The wireless communication apparatus according to claim 1,
wherein the communication controller starts a process to establish the first communication when a subject apparatus receives a specified instruction from outside.

8. The wireless communication apparatus according to claim 7,
wherein the specified instruction corresponds to an instruction to start a subject apparatus.

9. An identification information setup method comprising the steps of:
establishing first communication with a first wireless communication apparatus having identification information already set and receiving first information which is information to settle identification information to be set for a subject apparatus, from the first wireless communication apparatus;
setting identification information for a subject apparatus based on the first information received by the communication controller;
setting identification information for a subject apparatus, subsequently establishing second communication which is communication with a second wireless communication apparatus having identification information not set yet, and transmitting second information which is information to settle identification information to be set for the second wireless communication apparatus; and
not transmitting the second information after transmitting the second information to the second wireless communication apparatus.

10. The identification information setup method according to claim 9,
wherein the first communication and the second communication comply with a Bluetooth (registered trademark) Low Energy standard,
wherein an Advertising packet is transmitted to establish the first communication and a specified SCAN Response packet is transmitted in response to a SCAN Request packet from the first wireless communication apparatus that receives the Advertising packet,
wherein the specified SCAN Response packet is received from the second wireless communication apparatus and the second communication is established when information about identification information can be transmitted, and
wherein the specified SCAN Response packet notifies that a capability of transmitting information about identification information is a condition to establish communication.

11. The identification information setup method according to claim 10,
wherein the identification information is represented as a value of predetermined data type,
wherein, when the first information is successfully received from the first wireless communication apparatus, a value sequentially next to a value of identification information set for the first wireless communication apparatus is set as identification information for a subject apparatus, and
wherein, when the first information is unsuccessfully received from the first wireless communication apparatus, identification information for a subject apparatus is settled and identification information for a subject apparatus is set based on identification information that is included in an Advertising packet transmitted by another wireless communication apparatus and is set for the other wireless communication apparatus.

12. The identification information setup method according to claim 9,
wherein the second communication is established by selecting the second wireless communication apparatus as a communication partner such that the second wireless communication apparatus belongs to a plurality of the second wireless communication apparatuses and is available as an origin of transmitting a signal corresponding to the largest reception strength.

13. A non-transitory computer readable storage medium that allows a computer of a wireless communication apparatus to perform:
a reception step that establishes first communication with a first wireless communication apparatus having identification information already set and receives first information which is information to settle identification information to be set for a subject apparatus, from the first wireless communication apparatus;
a setup step that sets identification information for a subject apparatus based on the first information received by the communication controller;
a transmission step that sets identification information for a subject apparatus, subsequently establishes second communication which is communication with a second wireless communication apparatus having identification information not set yet, and transmits second information which is information to settle identification information to be set for the second wireless communication apparatus; and
a control step that controls a subject apparatus not to transmit the second information after transmitting the second information to the one second wireless communication apparatus.

* * * * *